United States Patent
Chen

(10) Patent No.: US 8,325,815 B2
(45) Date of Patent: Dec. 4, 2012

(54) METHOD AND SYSTEM OF HIERARCHICAL MOTION ESTIMATION

(75) Inventor: Ying-Ru Chen, Tainan (TW)

(73) Assignee: Himax Technologies Limited, Tainan County (TW)

( * ) Notice: Subject to any disclaimer, the term of this patent is extended or adjusted under 35 U.S.C. 154(b) by 445 days.

(21) Appl. No.: 12/701,786

(22) Filed: Feb. 8, 2010

(65) Prior Publication Data

US 2011/0194025 A1  Aug. 11, 2011

(51) Int. Cl.
*H04N 11/04* (2006.01)

(52) U.S. Cl. .......... 375/240.16; 375/240.21; 375/240.24

(58) Field of Classification Search ............. 375/240.16, 375/240.21, 240.24
See application file for complete search history.

(56) References Cited

U.S. PATENT DOCUMENTS

| | | | | |
|---|---|---|---|---|
| 5,355,328 A * | 10/1994 | Arbeiter et al. | ............... | 708/313 |
| 5,630,033 A * | 5/1997 | Purcell et al. | ................. | 345/418 |
| 5,737,023 A * | 4/1998 | Linzer | ...................... | 375/240.15 |
| 6,728,317 B1 * | 4/2004 | Demos | ...................... | 375/240.21 |
| 8,107,011 B2 * | 1/2012 | MacInnis | ...................... | 348/609 |
| 2009/0232201 A1 * | 9/2009 | Weatherspoon | ......... | 375/240.01 |

* cited by examiner

*Primary Examiner* — Christopher S Kelley
*Assistant Examiner* — Jonathan Torchman
(74) *Attorney, Agent, or Firm* — Stout, Uxa, Buyan & Mullins, LLP

(57) ABSTRACT

A method and system of hierarchical motion estimation include a reference frame and a current frame being downsampled, and the downsampled reference frame being stored. A coarse motion vector (MV) map is generated according to the downsampled reference frame and the downsampled current frame. Scan lines adjacent to a center scan line corresponding to a downsampled scan line in the downsampled reference frame are retrieved and then stored. A refined MV map is generated according to the coarse MV map, the current frame and the stored scan lines adjacent to the center scan line.

10 Claims, 4 Drawing Sheets

METHOD AND SYSTEM OF HIERARCHICAL MOTION ESTIMATION

BACKGROUND OF THE INVENTION

1. Field of the Invention

The present invention generally relates to image processing, and more particularly to hierarchical motion estimation.

2. Description of Related Art

In performing motion estimation to generate motion vectors, pixel data of a reference frame such as a previous frame are required to be retrieved from an external memory device. Considering the limited bandwidth of the memory device, it is almost inconceivable that pixel data could be retrieved from a usual memory device such as DDR SDRAM (double data rate synchronous dynamic random access memory) in a real-time manner.

In order to alleviate this difficulty, an internal memory area such as that of a cache is reserved in an integrated circuit for temporarily storing a portion, such as a search range, of the reference frame. Unfortunately, the size of the internal memory area becomes unacceptable for high-definition (HD) video with resolution of, for example, 1920×1080 pixels. As an example, for the search range of 1/10 in the HD video, the memory size of 108 (i.e., 1080*(1/10)) scan lines or, equivalently, 1658880 (i.e., 108*1920*8) bits, is required.

For the reason that conventional motion estimation systems or methods could not be practically adapted to higher-resolution video, a need has arisen to propose a novel scheme that is adaptable to higher-resolution video such as HD video in a practical manner.

SUMMARY OF THE INVENTION

In view of the foregoing, it is an object of an embodiment of the present invention to provide a system and method of hierarchical motion estimation that require reduced internal memory area without sacrificing precision of motion estimation under a limited bandwidth of an external memory device.

According to one embodiment, a first downsample unit downsamples a reference frame, and a second downsample unit downsamples a current frame, where the downsampled reference frame is stored in a coarse line buffer. A coarse motion vector (MV) estimator generates a coarse MV map according to the downsampled reference frame and the downsampled current frame. A refine line buffer receives and stores scan lines adjacent to a center scan line corresponding to a downsampled scan line in the downsampled reference frame. A refine MV estimator generates a refined MV map according to the coarse MV map, the current frame, and the stored scan lines adjacent to the center scan line.

DETAILED DESCRIPTION OF THE INVENTION

Figure 1:
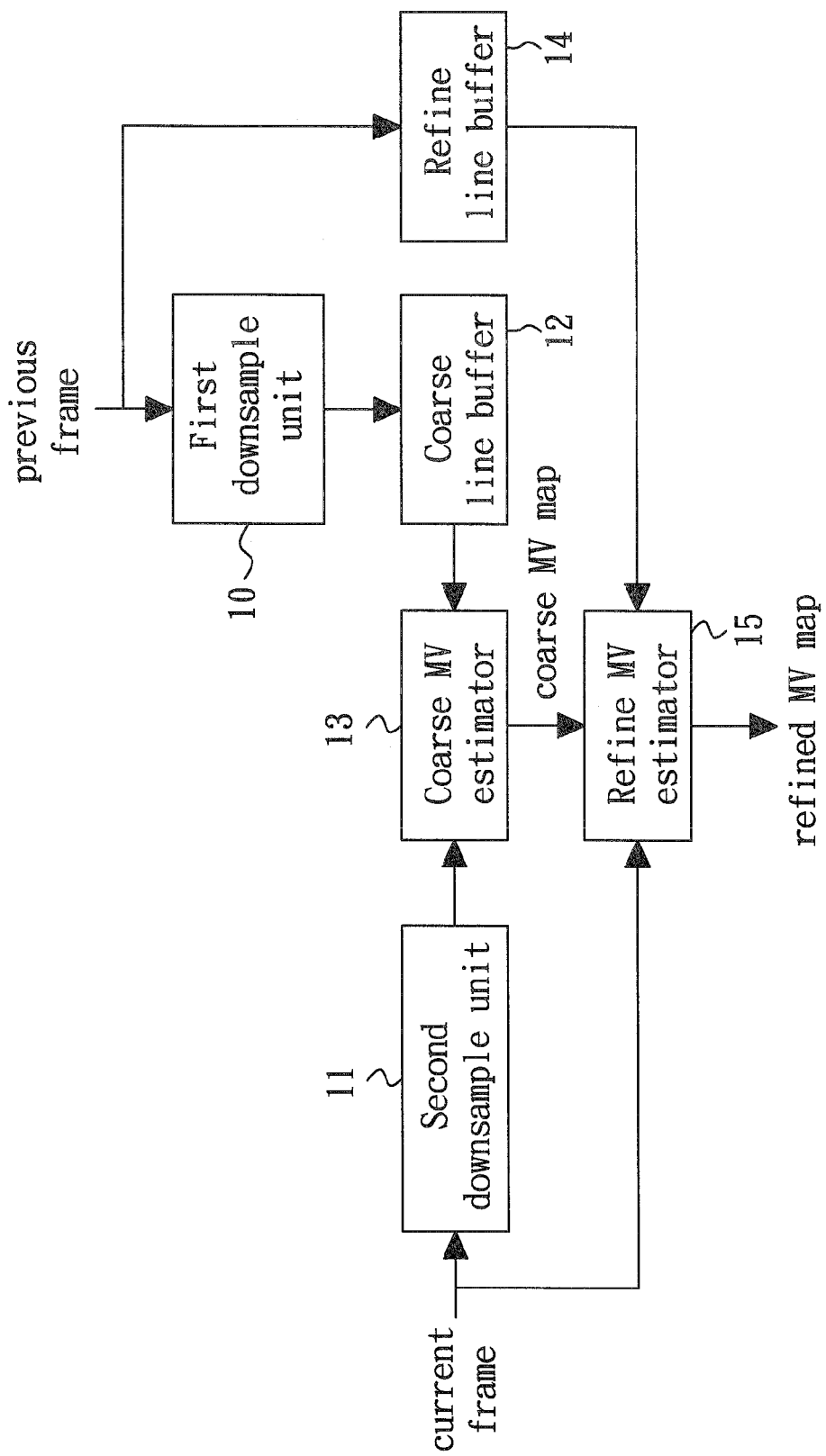
FIG. 1 is a block diagram that illustrates a system of hierarchical motion estimation according to one embodiment of the present invention.
Figure 2:
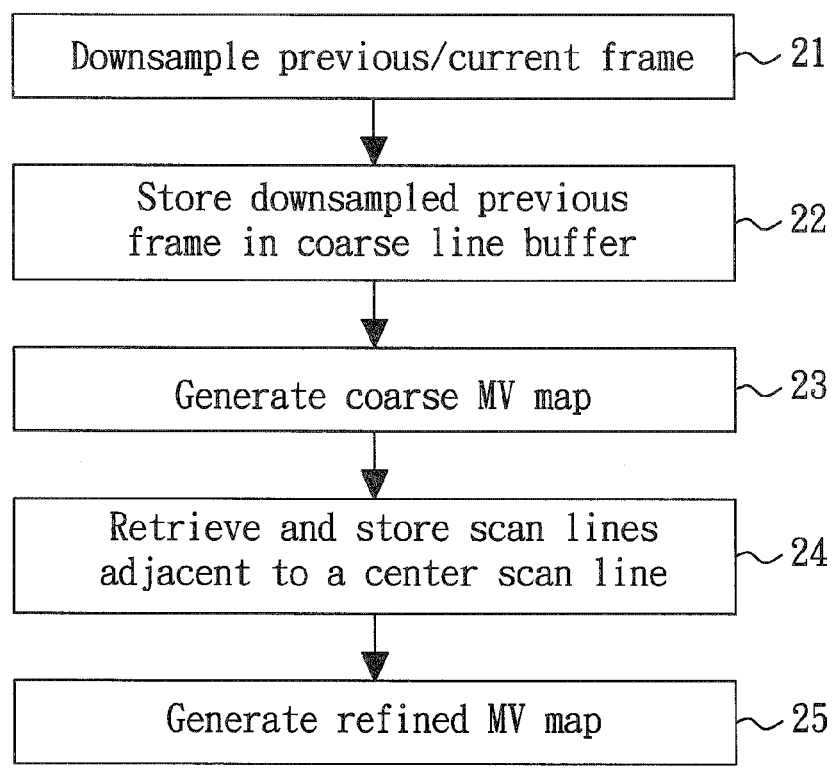
FIG. 2 is a flow diagram that illustrates a method of hierarchical motion estimation according to the embodiment of the present invention.

FIG. 1 shows a block diagram of a system of hierarchical motion estimation (ME) according to one embodiment of the present invention. FIG. 2 shows a flow diagram of a method of hierarchical motion estimation according to the embodiment of the present invention. The present embodiment may be adaptable to, but is not limited to, encoding of high-definition (HD) video with resolution of 1920×1080 pixels. Although a two-step hierarchical motion estimation method is illustrated, it is appreciated that the embodiment may be generalized to a hierarchical ME method with more than two steps.

Figure 3:
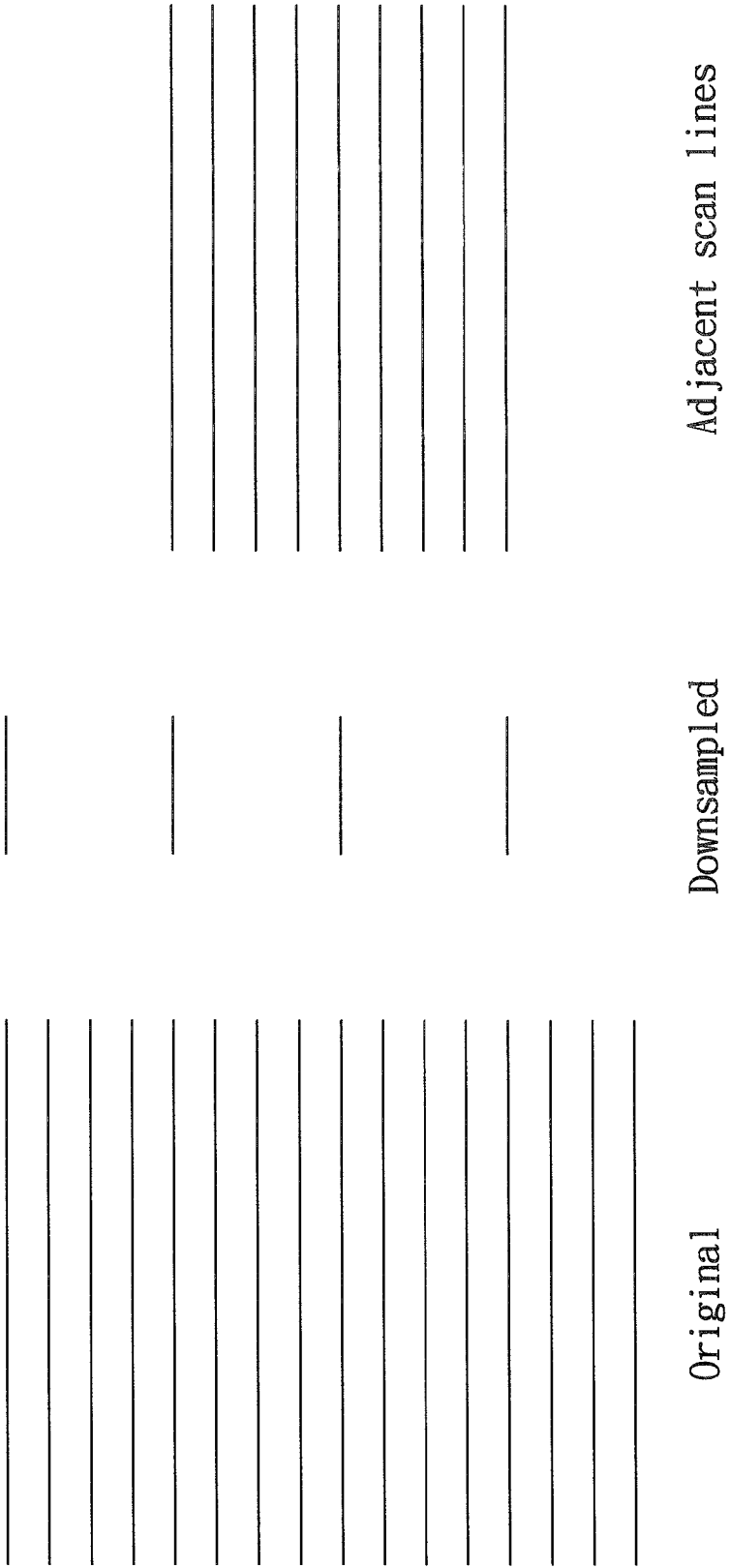
FIG. 3 exemplifies downsampling a portion of the frame.

Regarding the first step of the hierarchical ME according to the embodiment, a previous frame (or a reference frame, in general) is downsampled (or subsampled) by a first downsample unit 10 in step 21. Generally speaking, the height of the frame is downsampled by a downsampling factor of N, and the width of the frame is downsampled by a downsampling factor of M. In the embodiment, however, both the height and the width of the frame are downsampled with the same downsampling factor of N. In a specific embodiment, a search range of the previous frame is subjected to downsampling. The search range is a portion (e.g., 1/10) of the original frame. FIG. 3 exemplifies downsampling a portion of the frame by a downsampling factor of 4. In this example, one pixel is selected every four pixels both horizontally and vertically in the search range of the frame. Accordingly, data size is reduced to 1/16 (i.e., (1/4)*(1/4) or (1/n)*(1/M), in general) of the original search range. In the same step, a current frame that is, for example, to be encoded, is also subjected to downsampling by a second downsample unit 11. The downsampled previous frame is then stored in a coarse line buffer 12 in step 22. For example, if the search range of a HD frame consists of 108 scan lines, a coarse line buffer 12 having a size of 108*(1/4)*(1/4) is required to store the downsampled previous frame. It is noted that, although the previous frame is used as the reference frame in a forward ME, the present embodiment may be adapted to a backward ME in which the succeeding frame is used as the reference.

Subsequently, in step 23, a coarse motion vector (MV) estimator 13 generates a coarse MV map according to the downsampled previous frame and the downsampled current frame. The generated coarse MV map represents the movement or displacement of the current frame with respect to the previous (or reference) frame. Specifically, for block-based motion estimation, each macroblock in the MV map contains a motion vector (horizontal MV component, vertical MV component) that represents the movement or the displacement of the macroblock in the current frame with respect to the corresponding macroblock in the previous frame. In the generation of the coarse MV, a conventional metric such as, but not limited to, sum of absolute differences (SAD) may be utilized.

Regarding the second step of the hierarchical ME according to the embodiment, scan lines adjacent to a downsampled scan line in the previous frame are retrieved (from an external memory device such as DDR SDRAM (double data rate synchronous dynamic random access memory)) and stored in a refine line buffer 14 in step 24. In the embodiment, for a height-downsampling factor of N, N scan lines above the downsampled scan line (also called a center scan line) and N scan lines below the downsampled scan line, along with the center scan line, are retrieved. In other words, there are altogether (2*N+1) retrieved scan lines stored in the refine line buffer 14. FIG. 3 exemplifies (2*4+1) adjacent scan lines for the case N=4.

Afterwards, a refine MV estimator 15 generates, in step 25, a refined MV map according to the coarse MV map, the current frame and the scan lines stored in the refine line buffer 14. Accordingly, the precision of the MV generated from the coarse MV estimator 13 may be refined from N-pixels to 1-pixel. In the generation of the refined MV, conventional metric such as, but not limited to, sum of absolute differences (SAD) may be utilized.

Figure 4:
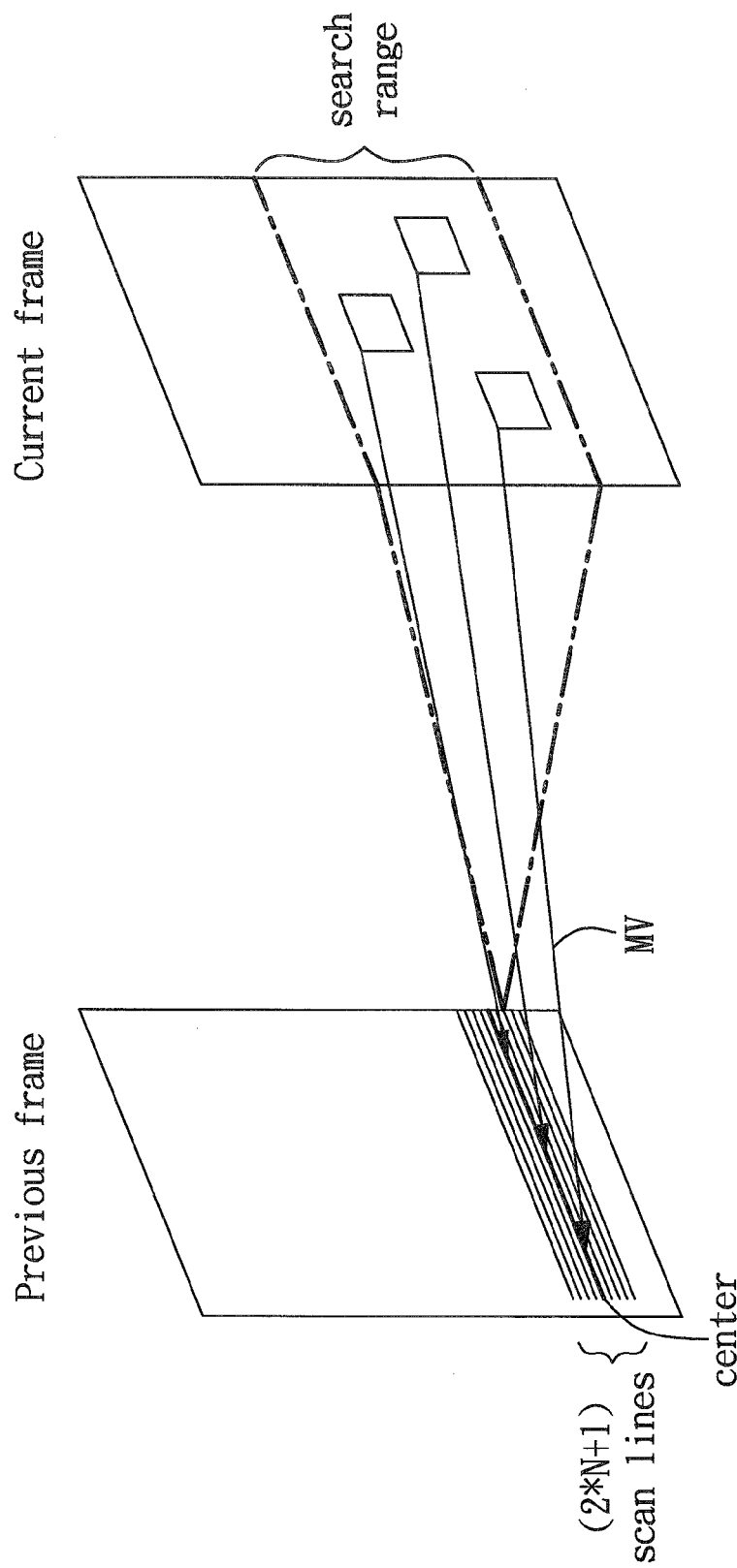
FIG. 4 shows an exemplary depiction of grouped motion estimation according to the embodiment of the present invention.

It is observed that, as the vertical MV components of contiguous macroblocks, in the current frame, may commonly be different, different sets of adjacent scan lines corresponding to different vertical MV components may be required to be re-loaded respectively to the refine line buffer 14, thereby causing a burden to the bandwidth of the external memory device. Instead of re-loading different set(s) of adjacent scan lines for the contiguous macroblock, in the embodiment, a grouped motion estimate is adapted such that a group of macroblocks, in the current frame, corresponding to the same center scan line in the refine line buffer 14 (i.e., corresponding to the same vertical position of the previous frame) is processed at the same time. In more detail, each macroblock is determined for the group by referring to the vertical MV component of the macroblock. FIG. 4 shows an exemplary depiction of the grouped motion estimation. It can be discerned from the figure that three macroblocks in the current frame have the same vertical position of the previous frame by referring to the vertical components respectively for the three macroblocks (as pointed by the corresponding arrow), and they are thus grouped together to perform motion estimation at the same time based on the same set of scan lines stored in the refine line buffer 14. After all the macroblocks in the same group have been processed, another set of scan lines with another center scan line are then retrieved and stored in the refine line buffer 14. In a specific embodiment, only the macroblocks located within a predetermined search range (for example, the search range as depicted in FIG. 4) in the current frame are processed, therefore further accelerating the motion estimation. It is noted that the location of the center of the predetermined search range is determined by the center scan line. In other words, different center scan lines correspond to different locations of center of the predetermined search range.

According to the embodiment illustrated above, the size of the line buffer (12 and 14) may be substantially reduced to $SR*(1/N)*(1/M)+(2*N+1)$, where SR is the search range, N is the downsampling factor in height, and M is the downsampling factor in width. The illustrated embodiment may be implemented either by hardware or software or their combination. Furthermore, the illustrated embodiment may be well implemented by pipelining. For example, the second step of the hierarchical ME for the n-th frame may be executed concurrently with the first step of the hierarchical ME for the (n+1)-th frame.

Although specific embodiments have been illustrated and described, it will be appreciated by those skilled in the art that various modifications may be made without departing from the scope of the present invention, which is intended to be limited solely by the appended claims.

What is claimed is:

1. A method of hierarchical motion estimation, comprising:
  downsampling a reference frame and a current frame;
  storing the downsampled reference frame;
  generating a coarse motion vector (MV) map according to the downsampled reference frame and the downsampled, current frame;
  retrieving and then storing scan lines adjacent to a center scan line corresponding to a downsampled scan line in the downsampled reference frame; and
  generating a refined MV map according to the coarse MV map, the current frame and the stored scan lines adjacent to the center scan line;
  wherein a height of the reference/current frame is downsampled, by a downsampling factor of N, and a width of the reference/current frame is downsampled, by a downsampling factor of M, such that one pixel is selected every N pixels vertically, and one pixel is selected every M pixels horizontally, thereby causing a size of the reference frame to be reduced, by $(1/N)*(1/M)$, with N and M being positive integers;
  wherein the stored scan lines adjacent to the center scan line comprises:
  N scan lines above the center scan line; and
  N scan lines below the center scan line; thereby corresponding to $2*N+1$ scan lines being stored.

2. The method of claim 1, wherein a search range of the reference frame and the current frame is subjected to the downsampling.

3. The method of claim 1, in the step of generating the refined MV map, a macroblock or macroblocks in the current frame that correspond to the stored center scan line according to the coarse MV map are collectively processed.

4. The method of claim 3, wherein the macroblock or the macroblocks within a predetermined search range in the current frame are processed.

5. The method of claim 1, wherein the step of generating the refined MV map for nth current frame is performed concurrently with the step of generating the coarse MV map for (n+1)-th current frame.

6. A system of hierarchical motion estimation, comprising:
  a first downsample unit configured to downsample a reference frame;
  a second downsample unit configured to downsample a current frame;
  a coarse line buffer constructed to store the downsampled reference frame;
  a coarse motion vector (MV) estimator arranged to generate a coarse MV map according to the downsampled reference frame and the downsampled current frame;
  a refine line buffer coupled to receive and store scan lines adjacent to a center scan line corresponding to a downsampled scan line in the downsampled reference frame; and
  a refine MV estimator assembled to generate a refined MV map according to the coarse MV map, the current frame and the stored scan lines adjacent to the center scan line;
  wherein the system is configured to cause a height of the reference/current frame to be downsampled by a downsampling factor of N, and a width of the reference/current frame to be downsampled by a downsampling factor of M, such that one pixel is selected every N pixels vertically, and one pixel is selected every M pixels horizontally, thereby resulting in a size of the reference frame being reduced by $(1/N)*(1/M)$, with N and M being positive integers;
  wherein the scan lines adjacent to the center scan line stored in the refine line buffer comprise:
  N scan lines above the center scan line; and
  N scan lines below the center scan line; thereby corresponding to $(2*N+1)$ scan lines being stored.

7. The system of claim 6, wherein the system is configured to subject a search range of the reference frame to downsampling by the first downsample unit, and to subject the corresponding search range of the current frame to downsampling by the second downsample unit.

8. The system of claim 6, wherein the refine MV estimator is configured to collectively process a macroblock or macroblocks in the current frame that correspond to the stored center scan line according to the coarse MV map.

9. The system of claim 8, wherein the MV estimator is configured to process the macroblock or the macroblocks within a predetermined search range in the current frame.

10. The system of claim 6, wherein the MV estimator is configured to generate the refined MV map for n-th current frame concurrently with the generation of the coarse MV map for (n+1)-th current frame by the coarse MV estimator.

* * * * *